(12) United States Patent
Lu et al.

(10) Patent No.: US 8,977,607 B1
(45) Date of Patent: Mar. 10, 2015

(54) SYSTEM AND METHOD FOR THREADING ELECTRONIC MESSAGES

(71) Applicant: LinkedIn Corporation, Mountain View, CA (US)

(72) Inventors: Xiaobin Lu, San Mateo, CA (US); Elaine Chien, Santa Clara, CA (US)

(73) Assignee: LinkedIn Corporation, Mountain View, CA (US)

( * ) Notice: Subject to any disclaimer, the term of this patent is extended or adjusted under 35 U.S.C. 154(b) by 0 days.

(21) Appl. No.: 14/227,366

(22) Filed: Mar. 27, 2014

Related U.S. Application Data

(60) Provisional application No. 61/946,163, filed on Feb. 28, 2014.

(51) Int. Cl.
 *G06F 17/30* (2006.01)
(52) U.S. Cl.
 CPC .............................. *G06F 17/30595* (2013.01)
 USPC ......................................... 707/710; 707/687
(58) Field of Classification Search
 USPC ........................................ 707/710, 687, 705
 See application file for complete search history.

(56) References Cited

U.S. PATENT DOCUMENTS

| 2004/0260701 | A1* | 12/2004 | Lehikoinen et al. | 707/10 |
| 2005/0108345 | A1* | 5/2005 | Suzuki | 709/206 |
| 2006/0212286 | A1* | 9/2006 | Pearson et al. | 704/9 |
| 2009/0070294 | A1* | 3/2009 | Chijiiwa | 707/3 |
| 2011/0207484 | A1* | 8/2011 | Karnam Holal et al. | 455/466 |

* cited by examiner

*Primary Examiner* — Shiow-Jy Fan
(74) *Attorney, Agent, or Firm* — Schwegman Lundberg & Woessner, P.A.

(57) ABSTRACT

A system and method includes a network interface device to receive and retransmit electronic messages between a first user and a second user, an electronic data storage configured to store database entries related to electronic messages as received and retransmitted by the network interface device, at least some of the database entries including a latest message in thread flag identifying a latest electronic message in a thread of multiple electronic messages, and a processor. The processor may create a database entry corresponding to a first electronic message, the database entry including the latest message in thread flag indicating that the first electronic message is a latest electronic message of a thread, and change a status of a latest message in thread flag of a database entry corresponding to a second electronic message of the thread to indicate that the second electronic message is not a latest message in the thread.

21 Claims, 6 Drawing Sheets

FIRST USER DATABASE

| MESS. ID | IS_IN_INBOX | SUBJ | BODY | RECIP. | TIME | THRE. ID | LAST FLAG | THRE. SEQ. |
|---|---|---|---|---|---|---|---|---|
| 1000 | FALSE | XYZ | ABC | 2ND USER | DATE/TIME | 1000 | TRUE | 1 |
| 1003 | TRUE | XYZ | ABC | 1ST USER | DATE/TIME | 1000 | TRUE | 4 |

206C, 212, 234

SECOND USER DATABASE

| MESS. ID | IS_IN_INBOX | SUBJ | BODY | RECIP. | TIME | THRE. ID | LAST FLAG | THRE. SEQ. |
|---|---|---|---|---|---|---|---|---|
| 1001 | TRUE | XYZ | ABC | 2ND USER | DATE/TIME | 1000 | TRUE | 2 |
| 1002 | FALSE | XYZ | ABC | 1ST USER | DATE/TIME | 1000 | TRUE | 3 |

FIRST USER DATABASE

| MESS. ID | IS_IN_INBOX | SUBJ | BODY | RECIP. | TIME | THRE. ID | LAST FLAG | THRE. SEQ. |
|---|---|---|---|---|---|---|---|---|
| 1000 | FALSE | XYZ | ABC | 2ND USER | DATE/TIME | 1000 | FALSE | 1 |
| 1003 | TRUE | XYZ | ABC | 1ST USER | DATE/TIME | 1000 | TRUE | 4 |
| 1005 | FALSE | XYZ | ABC | 2ND USER | DATE/TIME | 1000 | TRUE | 5 |

206D, 212, 234, 236

SECOND USER DATABASE

| MESS. ID | IS_IN_INBOX | SUBJ | BODY | RECIP. | TIME | THRE. ID | LAST FLAG | THRE. SEQ. |
|---|---|---|---|---|---|---|---|---|
| 1001 | TRUE | XYZ | ABC | 2ND USER | DATE/TIME | 1000 | FALSE | 2 |
| 1002 | FALSE | XYZ | ABC | 1ST USER | DATE/TIME | 1000 | TRUE | 3 |
| 1007 | TRUE | XYZ | ABC | 2ND USER | DATE/TIME | 1000 | TRUE | 6 |

SYSTEM AND METHOD FOR THREADING ELECTRONIC MESSAGES

PRIORITY

This patent application claims the benefit of priority to U.S. Provisional Patent Application Ser. No. 61/946,163, filed on Feb. 28, 2014, which is incorporated herein by reference in its entirety.

TECHNICAL FIELD

The subject matter disclosed herein generally relates to threading electronic messages.

BACKGROUND

Computerized networking, such as computer networks, cellular networks, and the like, has long enabled electronic messages to be exchanged between users of various networks in various forms. Email, text message, personal messages, instant messages, simple mail transfer protocol (SMTP) messages, and the like, provide for one or more users of the computerized network to send text and/or files of various sorts to one another. Such electronic messages may be facilitated by any of a variety of platforms, such as dedicated messaging applications, applications in which electronic messaging may be ancillary to the primary function of the application, such as social networks, cellular telephones and other handheld electronic devices, and web-based interfaces.

BRIEF DESCRIPTION OF THE DRAWINGS

Some embodiments are illustrated by way of example and not limitation in the figures of the accompanying drawings.

FIGS. 2A-2D show an electronic message flow diagram between users of the social network 100 and the development of accompanying databases that are based on the electronic message flow, in an example embodiment.

DETAILED DESCRIPTION

Example methods and systems are directed to threading electronic messages. Examples merely typify possible variations. Unless explicitly stated otherwise, components and functions are optional and may be combined or subdivided, and operations may vary in sequence or be combined or subdivided. In the following description, for purposes of explanation, numerous specific details are set forth to provide a thorough understanding of example embodiments. It will be evident to one skilled in the art, however, that the present subject matter may be practiced without these specific details.

Electronic messages may be organized for presentation to parties to the messages, such as recipients and senders, according to a variety of criteria. Electronic messages may be displayed in the order in which they were received, according to the sender of the message, according to the recipient of the message, according to a message type, according to a file attachment to the message, and so forth. Electronic messages may further be organized according to a message thread that may develop as messages are interacted with by the parties to the messages, such as by replying to or forwarding messages. Thus, messages that are based on the same original message and that have been generated according to replies, forwards, and the like may be organized to provide ease of access to the messages that make up the thread.

Electronic messages may be organized in databases or other data storage formats. Such databases or data storage formats may include fields for storing both the data of the message, such as the text or files that make up the content of the message, as well as metadata of the message, such as a timestamp, an identity of the sender and recipient of the message, and so forth. The capabilities of the database in which the electronic messages are stored may impact how the electronic messages may be organized for presentation to the parties to the message. For instance, in the absence of a "group by" clause supported by certain databases, implementing data grouping for organizing threads may not be straightforward.

A system has been developed that utilizes a flag, such as a Boolean flag, and a sequence number to enable various groupings of electronic messages, such as according to a message thread. In the context of electronic message threading, all the messages belonging to the same thread may share the same thread identifier and a most recent message of the of the thread may have a flag that indicates that the message is the most recent message in time. When performing a query, only those messages that have a "true" flag, indicating that the message is most recent in time of a given thread, may be returned. Also, with sequence number, we can determine which message should have that flag to set when messages move between inbox and archive or trash folder.

Figure 1:
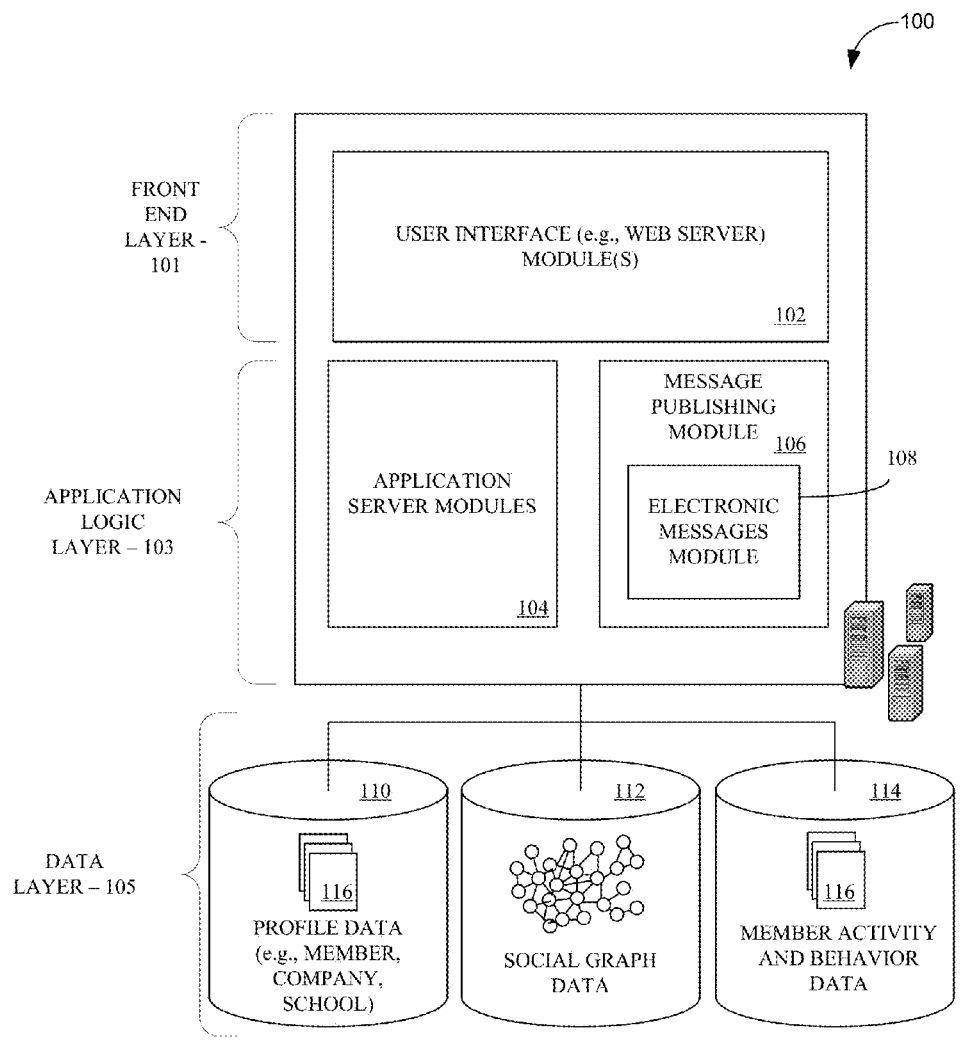
FIG. 1 is a block diagram illustrating various components or functional modules of a social network, in an example embodiment.
Figures 2A, 2B:
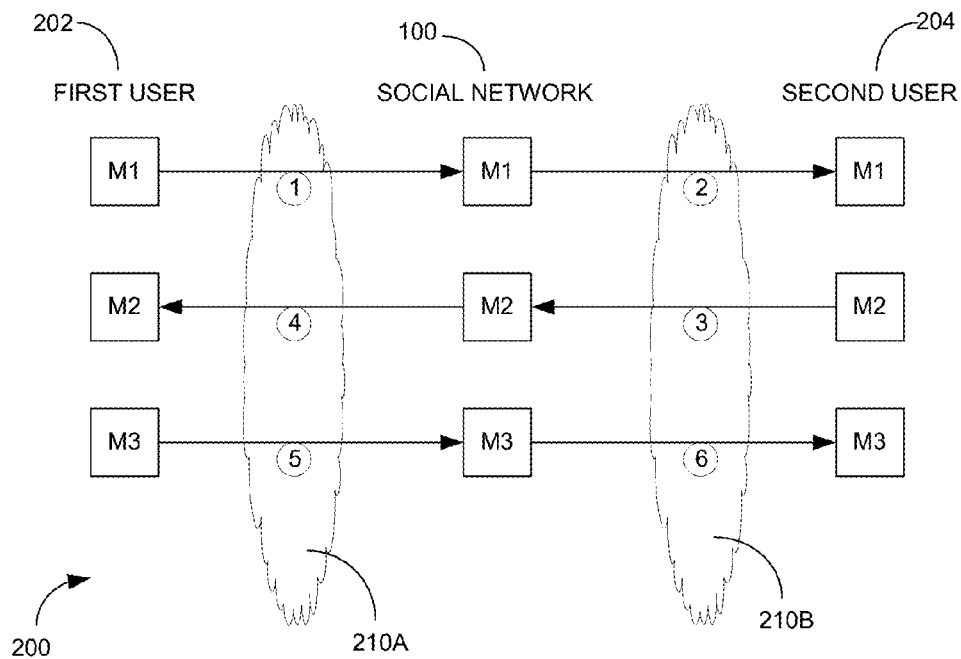

FIG. 1 is a block diagram illustrating various components or functional modules of a social network 100, consistent with some examples. The social network 100 may be utilized to provide treaded electronic messages within the user interface of the social network 100. While the threading of electronic messages are described with particular respect to the social network 100, it is to be recognized and understood that the principles described with respect to threaded electronic messages may be applied to any of a variety of platforms and electronic messages beyond those directly applicable to a social network generally.

A front end 101 consists of a user interface module (e.g., a web server) 102, which receives requests from various client-computing devices, and communicates appropriate responses to the requesting client devices. For example, the user interface module(s) 102 may receive requests in the form of Hypertext Transport Protocol (HTTP) requests, or other web-based, application programming interface (API) requests. An application logic layer 103 includes various application server modules 104, which, in conjunction with the user interface module(s) 102, may generate various user interfaces (e.g., web pages, applications, etc.) with data retrieved from various data sources in a data layer 105. In some examples, individual application server modules 104 may be used to implement the functionality associated with various services and features of the social network service. For instance, the ability of an organization to establish a presence in the social graph of the social network 100, including the ability to establish a customized web page on behalf of an organization, and to publish messages or status updates on behalf of an organization, may be services implemented in independent application server modules 104. Similarly, a variety of other applications or services that are made available to members of the social network service may be embodied in their own application server modules 104. Alternatively, various applications may be embodied in a single application server module 104.

In some examples, the social network 100 includes a content item publishing module 106, such as may be utilized to receive content, such as electronic messages, posts, links, images, videos, and the like, and publish the content to the social network. The content item publishing module 106, or the social network 100 generally, may include an electronic messages module 108. As will be disclosed in detail herein, the electronic messages module 108 may manage electronic messages and organize and display such electronic messages according to a related thread.

As illustrated, the data layer 105 includes, but is not necessarily limited to, several databases 110, 112, 114, such as a database 110 for storing profile data, including both member profile data as well as profile data for various organizations. Consistent with some examples, when a person initially registers to become a member of the social network service, the person may be prompted to provide some personal information, such as his or her name, age (e.g., birthdate), gender, interests, contact information, home town, address, the names of the member's spouse and/or family members, educational background (e.g., schools, majors, matriculation and/or graduation dates, etc.), employment history, skills, professional organizations, and so on. This information is stored, for example, in the database 110. Similarly, when a representative of an organization initially registers the organization with the social network service, the representative may be prompted to provide certain information about the organization. This information may be stored, for example, in the database 110, or another database (not shown). With some examples, the profile data may be processed (e.g., in the background or offline) to generate various derived profile data. For example, if a member has provided information about various job titles the member has held with the same or different companies, and for how long, this information can be used to infer or derive a member profile attribute indicating the member's overall seniority level, or seniority level within a particular company. With some examples, importing or otherwise accessing data from one or more externally hosted data sources may enhance profile data for both members and organizations. For instance, with companies in particular, financial data may be imported from one or more external data sources, and made part of a company's profile.

Once registered, a member may invite other members, or be invited by other members, to connect via the social network service. A "connection" may require a bi-lateral agreement by the members, such that both members acknowledge the establishment of the connection. Similarly, with some examples, a member may elect to "follow" another member. In contrast to establishing a connection, the concept of "following" another member typically is a unilateral operation, and at least with some examples, does not require acknowledgement or approval by the member that is being followed. When one member follows another, the member who is following may receive status updates or other messages published by the member being followed, or relating to various activities undertaken by the member being followed. Similarly, when a member follows an organization, the member becomes eligible to receive messages or status updates published on behalf of the organization. For instance, messages or status updates published on behalf of an organization that a member is following will appear in the member's personalized data feed or content stream. In any case, the various associations and relationships that the members establish with other members, or with other entities and objects, are stored and maintained within the social graph database 112.

The social network service may provide a broad range of other applications and services that allow members the opportunity to share and receive information, often customized to the interests of the member. For example, with some examples, the social network service may include a photo sharing application that allows members to upload and share photos with other members. With some examples, members may be able to self-organize into groups, or interest groups, organized around a subject matter or topic of interest. With some examples, the social network service may host various job listings providing details of job openings with various organizations.

As members interact with the various applications, services and content made available via the social network service, information concerning content items interacted with, such as by viewing, playing, and the like, etc.) may be monitored and information concerning the interaction may be stored, for example, as indicated in FIG. 1 by the database 114. Thus, interactions with a content item by various users of the social network 100 may be stored and utilized in determining a status of a user who posted the content item (i.e., an influence status or level of the user) and an overall popularity of the content item.

The profile data database 110 and the member activity database 114 may, among other sources in the social network 100, include or store events 116. Such events include but are not necessarily limited to the posting of content items, birthdays, anniversaries, change of status (employment, location, etc.), a publication, and a previous interaction. Previous interactions may include electronic messages exchanged between members or users of the social network 100. Consequently, the member activity database 114 may be or may include database entries recording electronic messages exchanged over the social network, as disclosed herein. Events may be stored automatically and/or may be stored on the basis of a user selection or choice.

Although not shown, with some examples, the social network 100 provides an application programming interface (API) module via which third-party applications can access various services and data provided by the social network service. For example, using an API, a third-party application may provide a user interface and logic that enables an authorized representative of an organization to publish messages from a third-party application to various content streams maintained by the social network service. Such third-party applications may be browser-based applications, or may be operating system-specific. In particular, some third-party applications may reside and execute on one or more mobile devices (e.g., phone, or tablet computing devices) having a mobile operating system.

FIGS. 2A-2D show an electronic message flow diagram between users of the social network 100 and the development of accompanying databases that are based on the electronic message flow, in an example embodiment. The follow diagram 200 (FIG. 2A) illustrates the exchange of electronic messages of a thread between a first user 202 and a second user 204 by way of the social network 100 as managed by the electronic messages module 108. The first and second users 202, 204 may be understood to represent both the entity who is the user of the social network 100 as well as the computing equipment with which the user is interacting with the social network 100 and generating electronic messages.

A first user database 206 (FIGS. 2B-2D) is stored in the member activity database 114 to record the electronic messages as the electronic messages relate to the first user 202. A second user database 208 (FIGS. 2B-2D) is stored in the member activity database 114 to record the electronic messages as the electronic messages relate to the second user 204. While a single thread is illustrated, it is to be understood that multiple threads may exist between the first and second users 200, 202 concurrently and between the first and second users 200, 202 and other users of the social network.

In flow step (1), when the first user 202 transmits a first electronic message M1 to the second user 204, data related to the first electronic message M1 passes over a network connection 210A to the social network 100 and, in particular, to the electronic messages module 108. The electronic messages module 108 extracts relevant data and metadata from the first electronic message M1 and stores the data and metadata as extracted in a first electronic message database entry 212 in the first user database 206.

In flow step (2), the electronic messages module 108 establishes a second electronic message database entry 213 for the first electronic message M1 in the second user database 208 with data and metadata consistent from the perspective of the second user 204. The electronic message module 108 then transmits the first electronic message M1 to the second user 204. The databases 206B, 208B illustrated in FIG. 2B reflect the state of the databases following the transmittal of the first electronic message M1 to the second user 204.

As illustrated, the first user database 206 includes a message identification field 214, an IS_IN_INBOX flag 216, a subject field 218, a body field 220, a recipient field 222, a timestamp field 224, a thread identification field 226, a LAST_MESSAGE_IN_THREAD flag 228, and a thread message sequence field 230. The message identification field 214 may store a unique identifier for the first electronic message M1 as generated by the electronic messages module 108. In an example, the unique identifier is globally unique to the first electronic message M1, though in alternative examples the identifier is locally unique according to any of a variety of criteria.

In an example, the IS_IN_INBOX flag 216 may store metadata that indicates if the first electronic message M1 is currently included in the inbox of the first user 202. An inbox is used in this context as the term is commonly understood, such as primarily including electronic messages that have been received by the owner of the account associated with the inbox and electronic messages deliberate transferred in to the inbox by the user. The inbox may not conventionally or automatically include electronic messages sent by the user of the associated electronic message account and may not include electronic messages that have been deleted or otherwise from the inbox, such as to be archived out of the inbox. The inbox may include folders into which electronic messages have been or may be stored for organizational purposes. The IS_IN_INBOX flag 216 may be static (e.g., upon being set may not be updated regardless of the current status of the associated electronic message) or may be updated based on the current status of the associated electronic message.

The subject field 218 may store a subject line of the first electronic message M1. The subject line may be a subject line of the electronic as well understood in the art and as produced by the first user 202. The body field 220 similarly may store the body of the first electronic message M1 as well understood in the art, including text and file attachments to the first electronic message M1.

The recipient field 222 may denote the recipient of the first electronic message M1, in this case the second user 204. The recipient field 222 may store an identifier of the second user 204, such as a social network account identifier, a general networking identifier, or other identifier that may uniquely identify the second user 204. In an example, the timestamp field 224 may denote a time the electronic message module 108 received or otherwise processed the first electronic message M1. Alternatively, the timestamp field 224 may be populated with a timestamp from the first electronic message M1, such as reflecting a time the first electronic message M1 was sent from the first user 202.

The thread identification field 226 may include a unique identifier for the thread associated with the first electronic message M1. In an example, the thread identification field 226 is populated with the message identifier of the first message of the thread, i.e., in the case of the first electronic message M1 the thread identification field 226 is populated with the same entry as in the message identification field 214. Thus, in the illustrated example, the message identification field 214 and the thread identification field 226 are both populated with the numeral "1000". As such, while the first electronic message M1 of the thread have the same value in the identification fields 214, 226, subsequent electronic messages of the thread will include the same thread identifier in the thread identification field 226 as the first electronic message M1 while having a unique message identifier in the message identification field 214.

The LAST_MESSAGE_IN_THREAD flag 228 denotes the last message in the thread in its respective database 206, 208 and that is in the inbox and not in the inbox for the respective database 206, 208. Thus, if there are both messages that are in the inbox and not in the inbox in a given database 206, 208 then potentially two electronic message may have the LAST_MESSAGE_IN_THREAD flag 228 set to "true". The LAST_MESSAGE_IN_THREAD flag 228 may be set based on the timestamp field 224, with the latest electronic message in time having the LAST_MESSAGE_IN_THREAD flag 228 set as "true", according to the message identification field 214, with the highest message identifier resulting in the LAST_MESSAGE_IN_THREAD flag 228 being set to "true", according to the thread message sequence field 230, with the highest value (as discussed below) resulting in the LAST_MESSAGE_IN_THREAD flag 228 being set to "true", or according to any of a variety of criteria. The thread message sequence field 230 may be set by providing a unique identifier for the first electronic message M1 in the thread, e.g., by starting at a value and incrementing the value with each new database entry, among various potential mechanisms.

It is noted and emphasized that, while, for instance, the IS_IN_INBOX flag 216 may optionally be adjusted following a change of status of an electronic message to or from an inbox, the LAST_MESSAGE_IN_THREAD flag 228 may be changed upon identification that the status of the electronic message in question has changed. Thus, as will be illustrated herein, if a given electronic message has the LAST_MESSAGE_IN_THREAD flag 228 set to "true" but that status is no longer correct then the LAST_MESSAGE_IN_THREAD flag 228 may be set to "false" for that electronic message.

In an example, a procedure may be established to identify one "true" LAST_MESSAGE_IN_THREAD flag 228 that is the legitimate last message in the thread for the respective user database 206, 208. In an example, conflicting "true" flags 228 may be resolved according to the highest thread message sequence field 230 value. Additionally or alternatively, the timestamp field 224 or message identification field 214 may be utilized, among various potential mechanisms for resolving the conflict between competing "true" flags.

In flow step (3) the second user 204 replies to the first electronic message M1 by generating and transmitting a second electronic message M2. The reply message M2 may be generated according to any of a variety of mechanisms for responding to electronic messages known in the art, such as replying, forwarding, and the like. The second electronic message M2 is transmitted via the second network connection 210B to the electronic messages module 108. The electronic messages module 108 may then establish a third electronic message database entry 232 in the second user database 206C (FIG. 2C) consistent with the second electronic message M2 as received from the second user 204.

In flow step (4) the electronic messages module 108 transmits the second electronic message M2 to the first user 202. The electronic message module 108 further creates a fourth electronic message database entry 234 in the first user database 206C (FIG. 2C) consistent with the second electronic message M2 as transmitted.

In flow step (5) the first user 202 replies to the second electronic message M2 by generating and transmitting a third electronic message M3. The reply message M3 may be generated according to any of a variety of mechanisms for responding to electronic messages known in the art, such as replying, forwarding, and the like. The third electronic message M3 is transmitted via the second network connection 210B to the electronic messages module 108. The electronic messages module 108 may then establish a fifth electronic message database entry 236 in the first user database 206D (FIG. 2D) consistent with the third electronic message M3 as received from the first user 204.

In flow step (6) the electronic messages module 108 transmits the third electronic message M3 to the second user 204. The electronic message module 108 further creates a sixth electronic message database entry 238 in the second user database 208D (FIG. 2D) consistent with the second electronic message M2 as transmitted.

As illustrated in the transitions of the contents of the first and second databases 206, 208, the LAST_MESSAGE_IN_THREAD flag 228 may change as new electronic messages are added to the thread. Thus, for instance, when the third electronic message M3 is entered in the first user database 202 as the fifth electronic message database entry 238, the first electronic message database entry 212 no longer corresponds to the latest electronic message in the first user database 202. Thus, the LAST_MESSAGE_IN_THREAD flag 228 of the first electronic message database entry 212 is set from "true" to "false" and the LAST_MESSAGE_IN_THREAD flag 228 of the fifth electronic message database entry 238 is set to "true".

The electronic messages may include fields that may not necessarily be included in the database entries 212, 213, 232, 234, 236, 238 but which may be utilized in populating the database entries' 212, 213, 232, 234, 236, 238 fields. For instance, the first electronic message M1 is the originator of the illustrated thread is not related to a previous electronic message, and thus a relatedToID field of the first electronic message M1 may be "null". While the relatedToID field of the first electronic message M1 may not be stored in the first user database 206, the "null" status of the relatedToID field of the first electronic message M1 may provide the basis for setting the thread identification field 226 of the first electronic message database entry 212 the same as the message identification field 214, i.e., identify the first electronic message database entry 212 as being the start of the thread.

In an example, if the relatedToID field of an electronic message is "null", a new thread is created in the appropriate one of the first and second user databases 206, 208. If the relatedToID field is not null, the relatedToID may identify the preceding electronic message, e.g. M1, to which the current electronic message, e.g., M2, relates and retrieve the electronic message database entry that corresponds to the related message, e.g., the first electronic message database entry 212. Upon retrieving the associated electronic database entry, the thread identification field 226 corresponding to the reply message M2 may be set to the thread identification field 226 of the original message M1. The thread identification may also be utilized to finds a database entry that corresponds to the LAST_MESSAGE_IN_THREAD flag 228 being "true". The "true" flag may be set to "false" for the previously-last electronic message while the LAST_MESSAGE_IN_THREAD flag 228 may be set to "true" for new message, e.g., M2.

Figure 3:
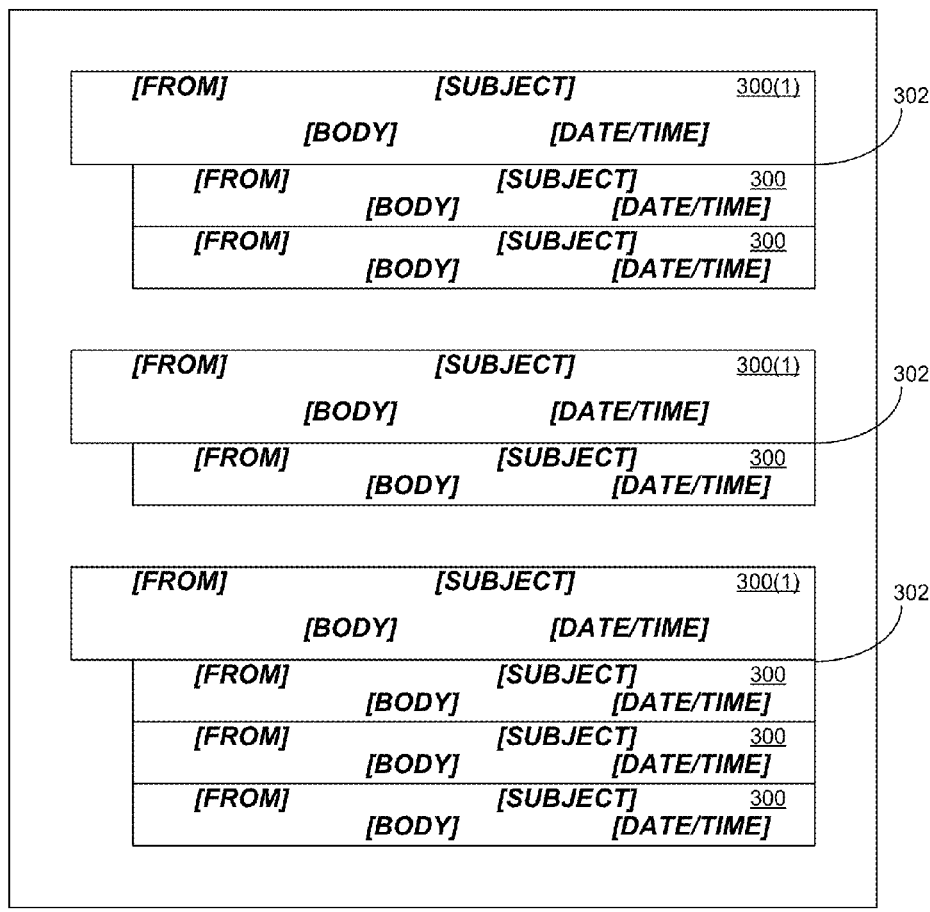
FIG. 3 is a user interface in which electronic messages are displayed according to thread, in an example embodiment.

FIG. 3 is a user interface in which electronic messages are displayed according to thread, in an example embodiment. Electronic messages 300 are displayed grouped according to thread 302. A latest electronic message 300(1) of each thread 302 is displayed in a more prominent position, such as on top of a stack of electronic messages 300 of the thread or as the only electronic message 300 of the thread 302 that is displayed unless the thread 302 is selected, whereupon the other electronic messages 300 of the thread 302 may be displayed.

Flowchart

Figure 4:
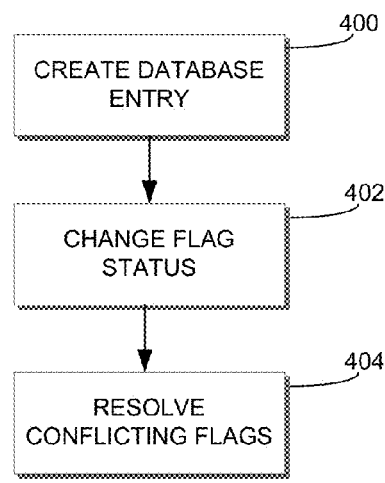
FIG. 4 is a flowchart for threading electronic messages, in an example embodiment.

FIG. 4 is a flowchart for threading electronic messages, in an example embodiment. The flowchart may be performed with any of a variety of devices and systems disclosed herein, as well as with any suitable system known in the art.

At operation 400, a database entry is created in an electronic data storage, the database entry corresponding to a first electronic message as received or retransmitted by a network interface device between a first user and a second user, the database entry including the latest message in thread flag indicating that the first electronic message is a latest electronic message of a thread corresponding to the first electronic message. In an example, the database entries further include a message identification field and a thread identification field, wherein each database entry corresponding to an electronic message of the thread includes a unique message identifier in its respective message identifier field and a common thread identifier in its respective thread identifier field. In an example, the thread includes an initial electronic message, wherein the common thread identifier of the thread is based, at least in part, on a message identifier of the initial electronic message. In an example, the common thread identifier is the same as the message identifier of the initial electronic message.

In an example, the electronic data storage is configured to store a first database corresponding to electronic messages received from and retransmitted to the first user and a second database corresponding to electronic messages received from and retransmitted to the second user, the common thread identifier being common to electronic messages corresponding to the thread in both the first and second databases. In an example, each of the first and second databases include at least one database entry having a latest message in thread flag indicating that a corresponding electronic message is the latest message in the thread.

At operation 402, a status of a latest message in thread flag of a database entry corresponding to a second electronic message of the thread is changed to indicate that the second electronic message is not a latest message in the thread.

At operation 404, the processor resolves conflicting latest message in thread flag statuses based, at least in part, on at least one of the timestamp field and the thread sequence field of the respective database entries. In an example, at least some of the database entries include at least one of a timestamp field and a thread sequence field.

System

Figure 5:
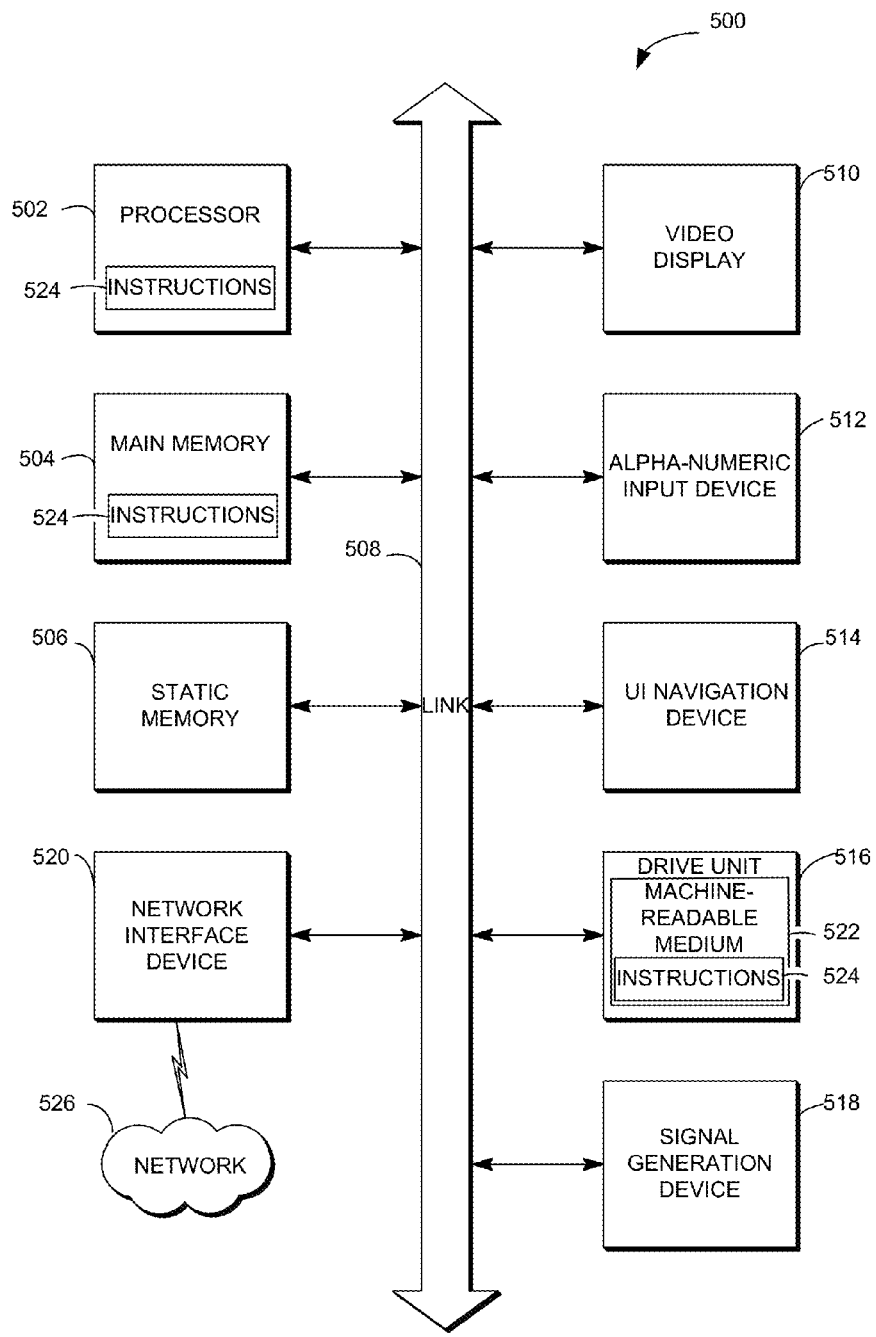
FIG. 5 is a block diagram illustrating components of a machine able to read instructions from a machine-readable medium.

FIG. 5 is a block diagram illustrating components of a machine 500, according to some example embodiments, able to read instructions from a machine-readable medium (e.g., a machine-readable storage medium) and perform any one or more of the methodologies discussed herein. Specifically, FIG. 5 shows a diagrammatic representation of the machine 500 in the example form of a computer system and within which instructions 524 (e.g., software) for causing the machine 500 to perform any one or more of the methodologies discussed herein may be executed. In alternative embodiments, the machine 500 operates as a standalone device or may be connected (e.g., networked) to other machines. In a networked deployment, the machine 500 may operate in the capacity of a server machine or a client machine in a server-client network environment, or as a peer machine in a peer-to-peer (or distributed) network environment. The machine 500 may be a server computer, a client computer, a personal computer (PC), a tablet computer, a laptop computer, a netbook, a set-top box (STB), a personal digital assistant (PDA), a cellular telephone, a smartphone, a web appliance, a network router, a network switch, a network bridge, or any machine capable of executing the instructions 524, sequentially or otherwise, that specify actions to be taken by that machine. Further, while only a single machine is illustrated, the term "machine" shall also be taken to include a collection of machines that individually or jointly execute the instructions 524 to perform any one or more of the methodologies discussed herein.

The machine 500 includes a processor 502 (e.g., a central processing unit (CPU), a graphics processing unit (GPU), a digital signal processor (DSP), an application specific integrated circuit (ASIC), a radio-frequency integrated circuit (RFIC), or any suitable combination thereof), a main memory 504, and a static memory 506, which are configured to communicate with each other via a bus 508. The machine 500 may further include a graphics display 510 (e.g., a plasma display panel (PDP), a light emitting diode (LED) display, a liquid crystal display (LCD), a projector, or a cathode ray tube (CRT)). The machine 500 may also include an alphanumeric input device 512 (e.g., a keyboard), a cursor control device 514 (e.g., a mouse, a touchpad, a trackball, a joystick, a motion sensor, or other pointing instrument), a storage unit 516, a signal generation device 518 (e.g., a speaker), and a network interface device 520.

The storage unit 516 includes a machine-readable medium 522 on which is stored the instructions 524 (e.g., software) embodying any one or more of the methodologies or functions described herein. The instructions 524 may also reside, completely or at least partially, within the main memory 504, within the processor 502 (e.g., within the processor's cache memory), or both, during execution thereof by the machine 500. Accordingly, the main memory 504 and the processor 502 may be considered as machine-readable media. The instructions 524 may be transmitted or received over a network 526 via the network interface device 520.

As used herein, the term "memory" refers to a machine-readable medium able to store data temporarily or permanently and may be taken to include, but not be limited to, random-access memory (RAM), read-only memory (ROM), buffer memory, flash memory, and cache memory. While the machine-readable medium 522 is shown in an example embodiment to be a single medium, the term "machine-readable medium" should be taken to include a single medium or multiple media (e.g., a centralized or distributed database, or associated caches and servers) able to store instructions. The term "machine-readable medium" shall also be taken to include any medium, or combination of multiple media, that is capable of storing instructions (e.g., software) for execution by a machine (e.g., machine 500), such that the instructions, when executed by one or more processors of the machine (e.g., processor 502), cause the machine to perform any one or more of the methodologies described herein. Accordingly, a "machine-readable medium" refers to a single storage apparatus or device, as well as "cloud-based" storage systems or storage networks that include multiple storage apparatus or devices. The term "machine-readable medium" shall accordingly be taken to include, but not be limited to, one or more data repositories in the form of a solid-state memory, an optical medium, a magnetic medium, or any suitable combination thereof.

Throughout this specification, plural instances may implement components, operations, or structures described as a single instance. Although individual operations of one or more methods are illustrated and described as separate operations, one or more of the individual operations may be performed concurrently, and nothing requires that the operations be performed in the order illustrated. Structures and functionality presented as separate components in example configurations may be implemented as a combined structure or component. Similarly, structures and functionality presented as a single component may be implemented as separate components. These and other variations, modifications, additions, and improvements fall within the scope of the subject matter herein.

Certain embodiments are described herein as including logic or a number of components, modules, or mechanisms. Modules may constitute either software modules (e.g., code embodied on a machine-readable medium or in a transmission signal) or hardware modules. A "hardware module" is a tangible unit capable of performing certain operations and may be configured or arranged in a certain physical manner. In various example embodiments, one or more computer systems (e.g., a standalone computer system, a client computer system, or a server computer system) or one or more hardware modules of a computer system (e.g., a processor or a group of processors) may be configured by software (e.g., an application or application portion) as a hardware module that operates to perform certain operations as described herein.

In some embodiments, a hardware module may be implemented mechanically, electronically, or any suitable combination thereof. For example, a hardware module may include dedicated circuitry or logic that is permanently configured to perform certain operations. For example, a hardware module may be a special-purpose processor, such as a field programmable gate array (FPGA) or an ASIC. A hardware module may also include programmable logic or circuitry that is temporarily configured by software to perform certain operations. For example, a hardware module may include software encompassed within a general-purpose processor or other programmable processor. It will be appreciated that the decision to implement a hardware module mechanically, in dedicated and permanently configured circuitry, or in temporarily configured circuitry (e.g., configured by software) may be driven by cost and time considerations.

Accordingly, the phrase "hardware module" should be understood to encompass a tangible entity, be that an entity that is physically constructed, permanently configured (e.g., hardwired), or temporarily configured (e.g., programmed) to operate in a certain manner or to perform certain operations described herein. As used herein, "hardware-implemented module" refers to a hardware module. Considering embodiments in which hardware modules are temporarily configured (e.g., programmed), each of the hardware modules need not be configured or instantiated at any one instance in time. For example, where a hardware module comprises a general-purpose processor configured by software to become a special-purpose processor, the general-purpose processor may be configured as respectively different special-purpose processors (e.g., comprising different hardware modules) at different times. Software may accordingly configure a processor, for example, to constitute a particular hardware module at one instance of time and to constitute a different hardware module at a different instance of time.

Hardware modules can provide information to, and receive information from, other hardware modules. Accordingly, the described hardware modules may be regarded as being communicatively coupled. Where multiple hardware modules exist contemporaneously, communications may be achieved through signal transmission (e.g., over appropriate circuits and buses) between or among two or more of the hardware modules. In embodiments in which multiple hardware modules are configured or instantiated at different times, communications between such hardware modules may be achieved, for example, through the storage and retrieval of information in memory structures to which the multiple hardware modules have access. For example, one hardware module may perform an operation and store the output of that operation in a memory device to which it is communicatively coupled. A further hardware module may then, at a later time, access the memory device to retrieve and process the stored output. Hardware modules may also initiate communications with input or output devices, and can operate on a resource (e.g., a collection of information).

The various operations of example methods described herein may be performed, at least partially, by one or more processors that are temporarily configured (e.g., by software) or permanently configured to perform the relevant operations. Whether temporarily or permanently configured, such processors may constitute processor-implemented modules that operate to perform one or more operations or functions described herein. As used herein, "processor-implemented module" refers to a hardware module implemented using one or more processors.

Similarly, the methods described herein may be at least partially processor-implemented, a processor being an example of hardware. For example, at least some of the operations of a method may be performed by one or more processors or processor-implemented modules. Moreover, the one or more processors may also operate to support performance of the relevant operations in a "cloud computing" environment or as a "software as a service" (SaaS). For example, at least some of the operations may be performed by a group of computers (as examples of machines including processors), with these operations being accessible via a network (e.g., the Internet) and via one or more appropriate interfaces (e.g., an application program interface (API)).

The performance of certain of the operations may be distributed among the one or more processors, not only residing within a single machine, but deployed across a number of machines. In some example embodiments, the one or more processors or processor-implemented modules may be located in a single geographic location (e.g., within a home environment, an office environment, or a server farm). In other example embodiments, the one or more processors or processor-implemented modules may be distributed across a number of geographic locations.

Some portions of this specification are presented in terms of algorithms or symbolic representations of operations on data stored as bits or binary digital signals within a machine memory (e.g., a computer memory). These algorithms or symbolic representations are examples of techniques used by those of ordinary skill in the data processing arts to convey the substance of their work to others skilled in the art. As used herein, an "algorithm" is a self-consistent sequence of operations or similar processing leading to a desired result. In this context, algorithms and operations involve physical manipulation of physical quantities. Typically, but not necessarily, such quantities may take the form of electrical, magnetic, or optical signals capable of being stored, accessed, transferred, combined, compared, or otherwise manipulated by a machine. It is convenient at times, principally for reasons of common usage, to refer to such signals using words such as "data," "content," "bits," "values," "elements," "symbols," "characters," "terms," "numbers," "numerals," or the like. These words, however, are merely convenient labels and are to be associated with appropriate physical quantities.

Unless specifically stated otherwise, discussions herein using words such as "processing," "computing," "calculating," "determining," "presenting," "displaying," or the like may refer to actions or processes of a machine (e.g., a computer) that manipulates or transforms data represented as physical (e.g., electronic, magnetic, or optical) quantities within one or more memories (e.g., volatile memory, non-volatile memory, or any suitable combination thereof), registers, or other machine components that receive, store, transmit, or display information. Furthermore, unless specifically stated otherwise, the terms "a" or "an" are herein used, as is common in patent documents, to include one or more than one instance. Finally, as used herein, the conjunction "or" refers to a non-exclusive "or," unless specifically stated otherwise.

What is claimed is:

1. A system, comprising:
    a network interface device configured to receive and retransmit electronic messages between a first user and a second user;
    an electronic data storage configured to store a first database and a second database, each database configured to store database entries related to electronic messages as received and retransmitted by the network interface device, at least some of the database entries including a binary latest message in thread flag identifying a latest electronic message in a thread of multiple electronic messages as stored in a respective one of the first database and the second database, wherein the first database corresponds to electronic messages received from the network interface device and retransmitted to the first user and the second database corresponds to electronic messages received from the network interface device and retransmitted to the second user; and
    a processor, coupled to the electronic data storage, configured to:
        create, in one of the first database and the second database, a database entry corresponding to a first electronic message as received or retransmitted to a respective one of the first user and the second user, the database entry including the latest message in thread flag indicating that the first electronic message is a latest electronic message of a thread corresponding to the first electronic message;
        changing a status of a latest message in thread flag of a database entry in the one of the first database and the second database corresponding to a second electronic message of the thread to indicate that the second electronic message is not a latest message in the thread; and cause a user interface to display data indicative of the first and second electronic messages based, at least in part, on the data base entries;
wherein the first electronic message is transmitted from the first user to the network interface and retransmitted from the network interface to the second user, wherein the database entry is a first database entry created in the first database, and wherein the processor is further configured to generate a second database entry corresponding to the first electronic message in the second database;
wherein the first database entry includes an inbox field having a false binary entry and the second database entry includes an inbox field having a true binary field; and
wherein, for each of the first database and the second database, the latest message in thread flag is set to true for a latest database entry in the thread that includes the inbox field having the false binary entry and is set to true for a latest database entry in the thread that has the inbox field having the true binary entry.

2. The system of claim 1, wherein the database entries further include a message identification field and a thread identification field, wherein each database entry corresponding to an electronic message of the thread includes a unique message identifier in its respective message identifier field and a common thread identifier in its respective thread identifier field.

3. The system of claim 2, wherein the thread includes an initial electronic message, wherein the common thread identifier of the thread is based, at least in part, on a message identifier of the initial electronic message.

4. The system of claim 3, wherein the common thread identifier is the same as the message identifier of the initial electronic message.

5. The system of claim 2, wherein the common thread identifier is common to electronic messages corresponding to the thread in both the first and second databases.

6. The system of claim 1, wherein the each of the first and second databases include at least one database entry having a latest message in thread flag indicating that a corresponding electronic message is the latest message in the thread.

7. The system of claim 1, wherein at least some of the database entries include at least one of a timestamp field and a thread sequence field, wherein processor is further configured to resolve conflicting latest message in thread flag statuses based, at least in part, on at least one of the timestamp field and the thread sequence field of the respective database entries.

8. A method, comprising:
creating, with a processor, a database entry in one of a first database and a second database stored in an electronic data storage, the database entry corresponding to a first electronic message as received or retransmitted by a network interface device between a first user and a second user, the database entry including a binary latest message in thread flag indicating that the first electronic message is a latest electronic message of a thread corresponding to the first electronic message as stored in a respective one of the first database and the second database, wherein the first database corresponds to electronic messages received from the network interface device and retransmitted to the first user and the second database corresponds to electronic messages received from the network interface device and retransmitted to the second user;
changing, with the processor, in the one of the first database and the second database, a status of a latest message in thread flag of a database entry corresponding to a second electronic message of the thread to indicate that the second electronic message is not a latest message in the thread; and
causing a user interface to display data indicative of the first and second electronic messages based, at least in part, on the data base entries;
wherein the first electronic message is transmitted from the first user to the network interface and retransmitted from the network interface to the second user, wherein the database entry is a first database entry created in the first database, and wherein the processor is further configured to generate a second database entry corresponding to the first electronic message in the second database;
wherein the first database entry includes an inbox field having a false binary entry and the second database entry includes an inbox field having a true binary field; and
wherein, for each of the first database and the second database, the latest message in thread flag is set to true for a latest database entry in the thread that includes the inbox field having the false binary entry and is set to true for a latest database entry in the thread that has the inbox field having the true binary entry.

9. The method of claim 8, wherein the database entries further include a message identification field and a thread identification field, wherein each database entry corresponding to an electronic message of the thread includes a unique message identifier in its respective message identifier field and a common thread identifier in its respective thread identifier field.

10. The method of claim 9, wherein the thread includes an initial electronic message, wherein the common thread identifier of the thread is based, at least in part, on a message identifier of the initial electronic message.

11. The method of claim 10, wherein the common thread identifier is the same as the message identifier of the initial electronic message.

12. The method of claim 9, wherein the common thread identifier is common to electronic messages corresponding to the thread in both the first and second databases.

13. The method of claim 9, wherein each of the first and second databases include at least one database entry having a latest message in thread flag indicating that a corresponding electronic message is the latest message in the thread.

14. The method of claim 8, wherein at least some of the database entries include at least one of a timestamp field and a thread sequence field, wherein processor is further configured to resolve conflicting latest message in thread flag statuses based, at least in part, on at least one of the timestamp field and the thread sequence field of the respective database entries.

15. A non-transitory computer readable storage medium, comprising:
a database entry creation module configured to create, in one of a first database and a second database stored in an electronic data storage, the database entry corresponding to a first electronic message as received or retransmitted by a network interface device between a first user and a second user, the database entry including a binary latest message in thread flag indicating that the first electronic message is a latest electronic message of a thread corresponding to the first electronic message as stored in a respective one of the first database and the second database, wherein the first database corresponds to electronic messages received from the network interface device and retransmitted to the first user and the second database corresponds to electronic messages received from the network interface device and retransmitted to the second user;

a database entry changing module configured to change, in the one of the first database and the second database, a status of a latest message in thread flag of a database entry corresponding to a second electronic message of the thread to indicate that the second electronic message is not a latest message in the thread; and a user interface display module configured to cause a user interface to display data indicative of the first and second electronic messages based, at least in part, on the data base entries;

wherein the first electronic message is transmitted from the first user to the network interface and retransmitted from the network interface to the second user, wherein the database entry is a first database entry created in the first database, and wherein the processor is further configured to generate a second database entry corresponding to the first electronic message in the second database;

wherein the first database entry includes an inbox field having a false binary entry and the second database entry includes an inbox field having a true binary field; and wherein, for each of the first database and the second database, the latest message in thread flag is set to true for a latest database entry in the thread that includes the inbox field having the false binary entry and is set to true for a latest database entry in the thread that has the inbox field having the true binary entry.

16. The non-transitory computer readable storage medium of claim 15, wherein the database entries further include a message identification field and a thread identification field, wherein each database entry corresponding to an electronic message of the thread includes a unique message identifier in its respective message identifier field and a common thread identifier in its respective thread identifier field.

17. The non-transitory computer readable storage medium of claim 16, wherein the thread includes an initial electronic message, wherein the common thread identifier of the thread is based, at least in part, on a message identifier of the initial electronic message.

18. The non-transitory computer readable storage medium of claim 17, wherein the common thread identifier is the same as the message identifier of the initial electronic message.

19. The non-transitory computer readable storage medium of claim 16, wherein the common thread identifier is common to electronic messages corresponding to the thread in both the first and second databases.

20. The non-transitory computer readable storage medium of claim 16, wherein each of the first and second databases include at least one database entry having a latest message in thread flag indicating that a corresponding electronic message is the latest message in the thread.

21. The non-transitory computer readable storage medium of claim 15, wherein at least some of the database entries include at least one of a timestamp field and a thread sequence field, wherein the database entry creation module and the database entry changing module are further configured to resolve conflicting latest message in thread flag statuses based, at least in part, on at least one of the timestamp field and the thread sequence field of the respective database entries.

* * * * *

UNITED STATES PATENT AND TRADEMARK OFFICE
CERTIFICATE OF CORRECTION

| | | |
|---|---|---|
| PATENT NO. | : 8,977,607 B1 | Page 1 of 1 |
| APPLICATION NO. | : 14/227366 | |
| DATED | : March 10, 2015 | |
| INVENTOR(S) | : Lu et al. | |

It is certified that error appears in the above-identified patent and that said Letters Patent is hereby corrected as shown below:

In the Claims

In column 13, line 3, in Claim 1, delete "data base" and insert --database--, therefor In column 14, line 6, in Claim 8, delete "data base" and insert --database--, therefor In column 15, line 12-13, in Claim 15, delete "data base" and insert --database--, therefor Signed and Sealed this
Twenty-eighth Day of July, 2015

Michelle K. Lee
*Director of the United States Patent and Trademark Office*